United States Patent [19]

Phillips et al.

[11] 3,786,335

[45] Jan. 15, 1974

[54] POWER CONVERSION APPARATUS AND SYSTEM THEREFOR

[75] Inventors: Edward H. Phillips, Los Altos; Raymond D. Underwood, Saratoga, both of Calif.

[73] Assignee: Programmed Power, Inc., Menlo Park, Calif.

[22] Filed: Oct. 18, 1971

[21] Appl. No.: 190,110

[52] U.S. Cl. .................. 321/69 R, 321/7, 321/61
[51] Int. Cl. .................................... H02m 5/30
[58] Field of Search .............. 321/9 A, 27 R, 60, 321/61, 40, 65, 66, 69, 3, 7

[56] References Cited
UNITED STATES PATENTS

| | | | |
|---|---|---|---|
| 3,593,103 | 7/1971 | Chandler et al. | 321/18 |
| 3,246,231 | 4/1966 | Clarke | 321/61 X |
| 3,600,655 | 8/1971 | Karlin | 321/27 R |
| 3,593,105 | 7/1971 | Brohaugh | 321/40 X |
| 3,319,147 | 5/1967 | Mapham | 321/9 A |
| 3,614,590 | 10/1971 | Kernick | 321/9 A |

FOREIGN PATENTS OR APPLICATIONS

| | | | |
|---|---|---|---|
| 1,565,845 | 5/1969 | France | 321/66 |

*Primary Examiner*—William M. Shoop, Jr.
*Attorney*—Flehr, Hohbach, Test, Albritton & Herbert

[57] ABSTRACT

Power conversion apparatus for converting a high frequency signal to a lower frequency a.c. or controlled d.c. output signal which includes an SCR bridge rectifier and a control system utilizing the integrated input signal for generating the firing voltages for the SCRs. An autotransformer in the bridge immunizes the magnitude of the output signal against changes in the load current.

12 Claims, 48 Drawing Figures

FIG_1

FIG_2

FIG_2A

FIG_3

FIG_7

FIG_11

FIG_4 FIG_5

FIG-6

FIG_8

FIG_9

FIG_10A

FIG_10B

FIG_10C

FIG_10D

POWER CONVERSION APPARATUS AND SYSTEM THEREFOR

BACKGROUND OF THE INVENTION

The present invention is directed to power conversion apparatus and a system therefor and more specifically to apparatus for converting a high frequency signal to a relatively low frequency a.c. or controlled d.c. signal.

In many power distribution systems, it is desired to have a stable source of low frequency or d.c. power. Such systems may have sensitive loads such as computers and their associated peripheral equipment or measuring instruments. When such sources are adjustable in both voltage and frequency they are also suitable for driving motors at varying speeds.

A controllable low frequency power source is also useful where an uninterruptible power supply is needed. Here inverter circuits are utilized for inverting a d.c. potential taken from storage batteries which may be floated across a battery charger output and in turn powered by the a.c. power supply lines. Such inverter circuits are most commonly used in generating 60 Hz from the d.c. source. They generate relatively complex waveforms which require extensive filtering and voltage regulation. Thus, the required 60 Hz transformers and filter components are both massive and expensive.

Another technique used for developing a controllable power signal is termed a cycloinverter. This system utilizes a high frequency inverter followed by a cycloconverter to obtain the desired low frequency or d.c. output. The cycloconverter converts a high frequency a.c. signal to a relatively low frequency signal. Such a system, however, has very uncertain operating and control parameters. In other words, it is unsuitable for driving relatively sensitive loads.

OBJECTS AND SUMMARY OF THE INVENTION

It is, therefore, a general object of the invention to provide improved power conversion apparatus.

It is another object of the invention to provide power conversion apparatus which is easily controllable and provides a relatively simple and uncomplex output waveform.

It is another object of the invention to provide power conversion apparatus which is relatively immune to changes in load.

It is another object of the invention to provide power conversion apparatus which is especially suitable for use in a power distribution system.

It is another object of the invention to provide power conversion apparatus which has superior control capability.

In accordance with the above objects there is provided power conversion apparatus for converting a high frequency power signal to a relatively low frequency or controlled d.c. signal including a SCR bridge rectifier. A two phase high frequency signal is supplied to two junctions of the bridge. Control means control the firing of the SCRs to convert the high frequency signal to a low frequency signal. Means are coupled to the other two junctions of the bridge for coupling the low frequency signal to a load. Such means include an autotransformer for immunizing the magnitude of the low frequency signal against changes in load.

From another aspect, apparatus as above may be used in a power distribution system where a plurality of such power conversion apparatus is provided for converting a high frequency signal to relatively low frequency or controlled d.c. signals at locations remote from a high frequency signal source.

From yet another aspect the specific control system used for firing the SCRs or control devices of a generalized rectifier or inverter circuit provides for superior control of the parameters of the circuit.

BRIEF DESCRIPTION OF THE DRAWINGS

FIGS. 3A–J are waveforms of the circuit of FIG. 2 useful in understanding the invention;

FIGS. 4A–J are waveforms similar to those in FIG. 3 but with a parameter change;

FIGS. 5A–L are waveforms similar to those in FIG. 4 showing the circuit of FIG. 2 in a typical operating condition;

FIGS. 7A–E are further waveforms useful in understanding the operation of the invention;

FIGS. 10A–D are waveforms useful in understanding the operation of the circuit of FIG. 9 when driven by the control system of the present invention.

DETAILED DESCRIPTION OF THE PREFERRED EMBODIMENTS

Figure 1:
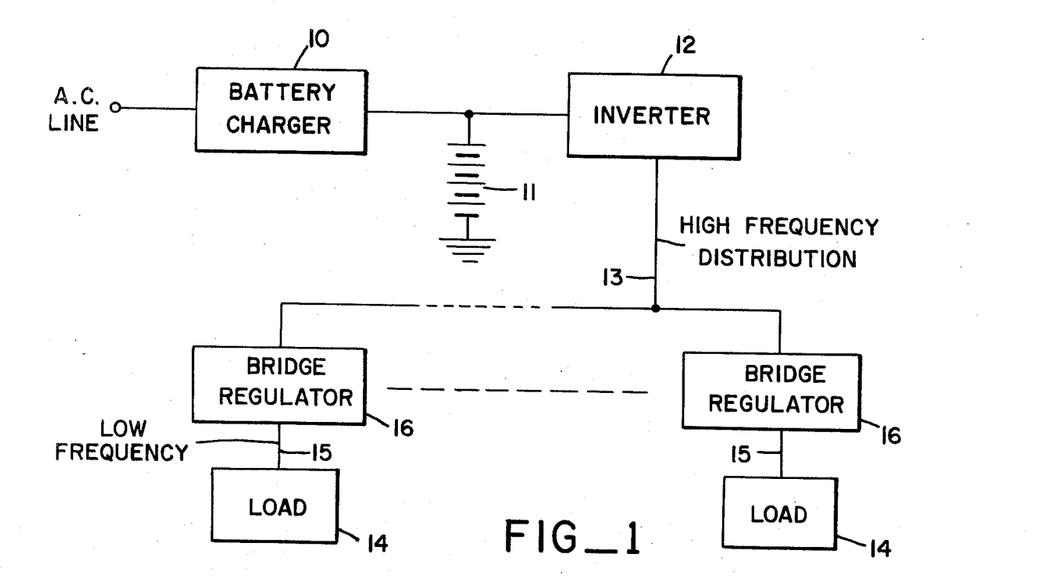
FIG. 1 is a block diagram of a typical system employing the present invention.

FIG. 1 illustrates the overall system in which the present invention is utilized and one of the preferred embodiments. Specifically, this is a power distribution system which has the feature of an uninterruptible supply of power and also provides an extremely accurate voltage in both magnitude and frequency to relatively sensitive loads.

A battery charger 10 is coupled to the a.c. line from the utility company. This maintains a charge on the battery 11 which provides an input d.c. power signal for an inverter 12. The inverter inverts the d.c. potential of battery 11 to a frequency of approximately 3,300 Hz. The power carried by this relatively high frequency signal is distributed on a distribution line 13 to several loads 14. However, this high frequency signal is converted to a low frequency signal on the lines 15 by the intermediate bridge regulators 16.

These regulators convert the 3,300 Hz signal to a lower frequency signal such as 60 Hz for a load 14 such as a computer or to d.c. If necessary, both the bridge regulators 16 and loads 14 can be at locations remote from the high frequency signal source which would include the inverter 12 and battery 11.

While in the preferred embodiment the high frequency signal has been designated 3,300 Hz this may be somewhat higher or lower. For example, 4 kHz is a practical upper limit because of the turn off time of the silicon controlled rectifiers (SCRs) used in bridge regulators 16. Typical SCRs for power use available today have rated turn off times of, for example, 25 microseconds. The lower limit of the high frequency signal distribution on transmission line 13 is approximately eight times the low frequency signal appearing on line 15. Since the output of the bridge regulators 16 are necessarily low pass filtered, this lower limit provides a low frequency output which contains only relatively higher frequencies so that such filtering is simplified. Theoretically, from a control standpoint, the bridge regulator 16 could operate at a ratio of 3 to 1; that is, a high frequency to low frequency signal ratio where if the low frequency signal was 60 Hz the high frequency signal would be 180 Hz. This would, however, result in a very ragged low frequency signal being produced by the bridge regulators 16 which would be very difficult to adequately filter.

Figures 2, 2A:
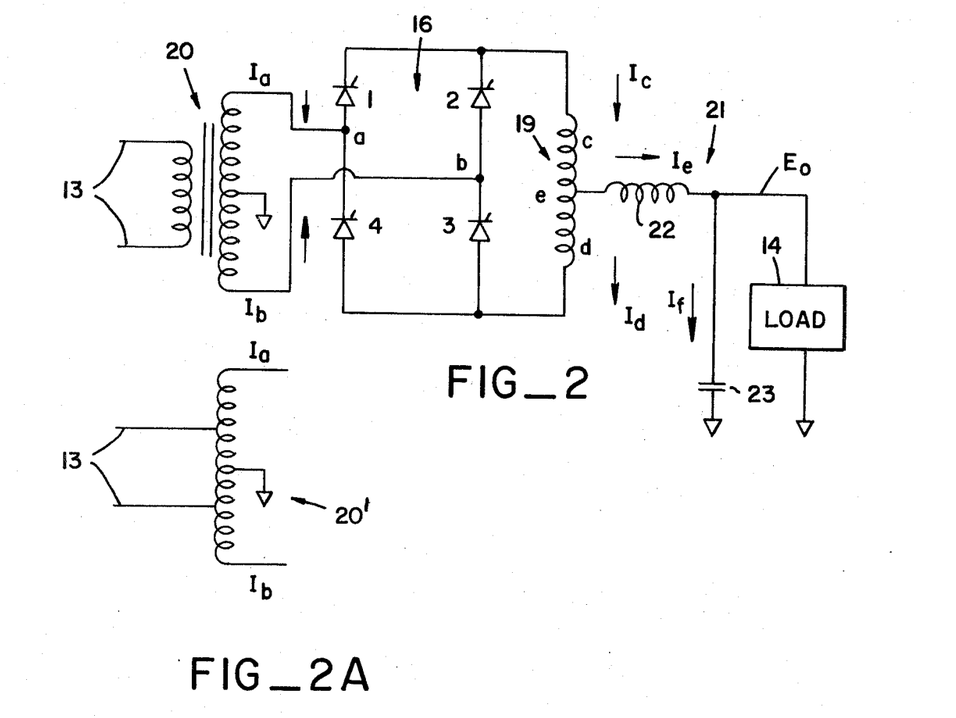
FIG. 2 is a simplified circuit schematic of a portion of FIG. 1.
FIG. 2A is a modification of a portion of FIG. 2.

FIG. 2 is a simplified circuit schematic of bridge regulator 16 of FIG. 1. It is essentially a full wave SCR bridge rectifier circuit which includes SCRs 1, 2, 3 and 4. The junctions of the bridge designated a and b are suppled a two phase high frequency signal from distribution line 13. The two phase signal is supplied by a center tapped transformer 20 which is coupled to distribution line 13. Alternatively, transformer 20 could be an autotransformer 20' as shown in FIG. 2A. The other two junctions of the bridge designated c and d are coupled to an autotransformer 19 which is in a 2:1:1 winding configuration. The winding center tap at point e is coupled to a low pass filter 21 which includes an inductor 22 and a capacitor 23 which is coupled to ground and receives a filter current designated $I_f$. Load 14 is coupled between inductor 22 and ground and receives a load current designated $I_0$. Although in most cases the load will be of a passive power consuming type, it may also be regenerative. The autotransformer has a first branch current $I_c$ and a second branch current $I_d$. The sum of the load current $I_0$ and the filter current $I_f$ is designated output current $I_e$. Due to the nature of the autotransformer, $I_e$ has an additive effect on branch current $i_c$ and a subtractive effect on branch current $I_d$ to thus maintain the sum $I_c + I_d$ constant.

Figure 3:
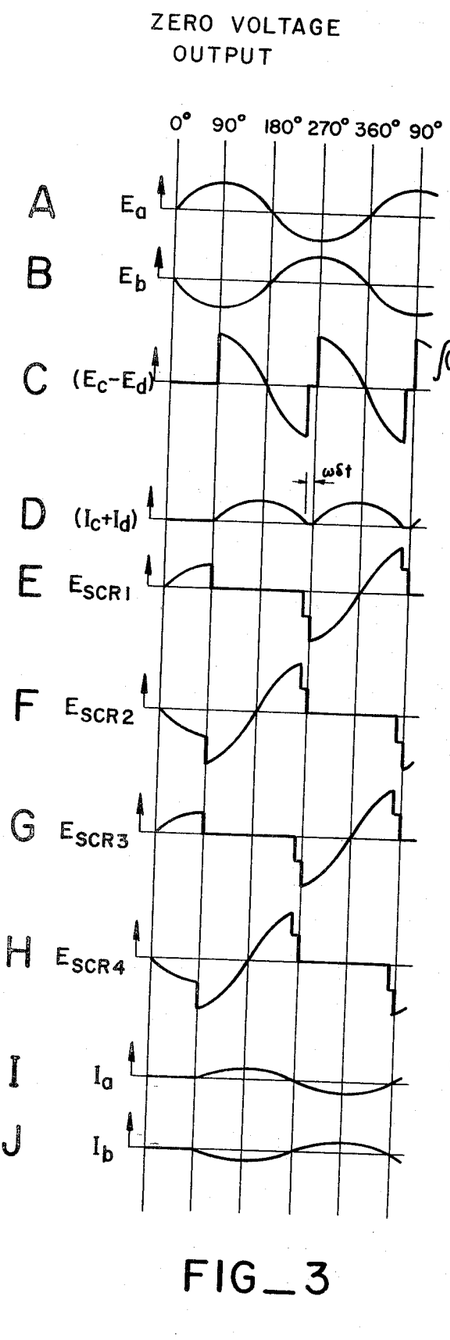

The simplest operation of the circuit of FIG. 2 is illustrated by the waveforms of FIGS. 3A through 3J. The two phase input waveforms are shown in FIGS. 3A and 3B and designated $E_a$ and $E_b$. They have a phasing of 180° between them. The incoming waveforms are illustrated as sine waves but they may be of virtually cyclical or periodic waveshape. By use of the control system of the present invention which will be described below, SCR1 and SCR 3 are fired as a pair 90° into the applied waveforms and SCR2 and SCR4 are fired as a pair 270° into the applied waveforms. When SCR1 and SCR3 are fired $$E_c = E_a \text{ and } E_d = E_b$$

or as illustrated in FIG. 3C $$E_c - E_d = 2E_a.$$

Current will flow into point c and out of point d inductively for 180° less than an angle designated $\omega\delta t$ to compensate for diode and ohmic voltage drops around the circuit. This current flow is shown in FIG. 3D as the sum of $I_c + I_d$ which for $I_0 = 0$ equals $2I_c$ which also equals $2I_d$. When SCR2 and SCR4 are fired $$E_c = E_b \text{ and } E_d = E_a$$

or $E_c - E_d = 2E_b$. Current, $I_c + I_d$ will then flow again as it did one half cycle previously. The voltage $E_e$ is always zero since $E_c = E_d$. In other words, the voltage at point e is the average of the voltage at the ends c and d of the autotransformer winding and for this case is identically zero.

In addition, the current sum $I_c + I_d$ is constructed from the appropriate algebraic sum of $I_a$ and $I_b$ as shown in FIGS. 3I and 3J.

Since the instantaneous flux level in the core of the autotransformer 19 must remain constant any output current demand must increase $I_c$ by $\frac{1}{2}I_e$ and decrease $I_d$ by the same amount.

Figure 4:
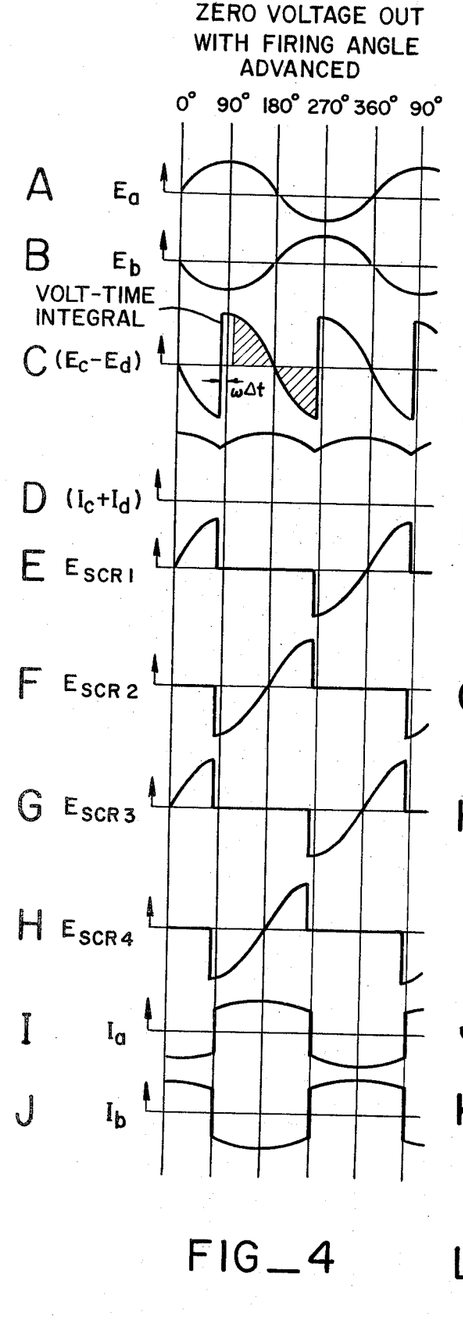

In accordance with the invention it is apparent that the load current may not be larger than the sum of $I_c + I_d$. Thus, as shown in FIG. 4D the firing angle of each of the SCRs is advanced with respect to the input waveforms $E_a$ and $E_b$.

Referring in detail to FIGS. 4A through 4J, by advancing the firing angle for all four SCRs by some angle $\omega\delta t$ which is greater than $\omega\delta t$ (FIG. 3) each pair of SCRs are turned on at an angle when the sum $I_c + I_d$ is non-zero in value. This will increase the level of $I_c + I_d$ to that shown in FIG. 4D until limited by further ohmic losses. The ohmic losses per half cycle are equal to the volt-time integral as illustrated in FIG. 4C.

Figure 5:
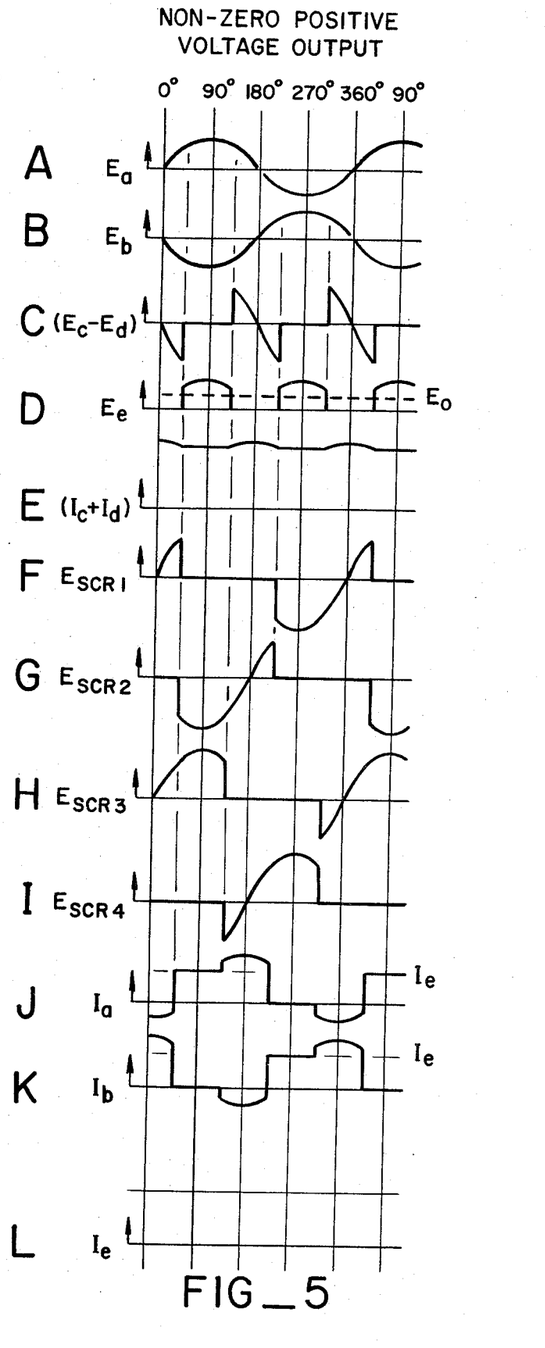

Under actual operating conditions, when a non-zero positive voltage output is desired, or, in other words, a postiive average value of $E_e$, the firing angle of each SCR must be individually altered as illustrated in FIGS. 5A through 5K. Specifically, as shown in FIGS. 5F through 5I, SCR1 and SCR2 are fired early and SCR3 and SCR4 are fired late. This yields a positive value, $E_e$, as shown in FIG. 5D which when filtered provides an output voltage $E_0$ as shown by the dashed line. Thus, FIG. 5 applies to a positive d.c. output voltage. In operation when SCR1 is fired, SCR2 and SCR4 are already in conduction as a result of previous operations but the voltage at junction a is greater than the voltage at junction b and firing SCR1 back biases SCR2 to turn it off while SCR4 remains conducting. Current $I_c$ now flows through SCR1 and $I_d$ through SCR4. This means that the input waveform $I_a$ in FIG. 5J supplies load current designated $I_0$ only, during this interval, and it is supplied through junction a. This is because during this interval there is a non-zero output voltage $E_e$, and such output voltage is $$E_e = E_c = E_d = E_a.$$

FIG. 5L illustrates a positive output current $I_e$. The algebraic sum of $I_a + I_b$ in FIGS. 5J and 5K is equal to the output current $I_e$ and is supplied by a center tapped transformer coupled to distribution line 13 (FIG. 1) from the ground or common connection made to the center tap. In practice $I_e$ has a small ripple; this can be minimized by increasing the size of the filter inductor 22.

Since junction b is at a lower voltage than junction a, firing SCR3 back biases SCR4 and turns it off. This new interval condition is similar to the zero voltage case of FIG. 4 with $E_e$ identically zero again. The sequential firing of SCR2 and SCR4 during the next half cycle operates in a similar manner with phase b supplying the output current only, as illustrated in FIG. 5K during the positive voltage increment as illustrated in FIG. 5D.

The average output voltage $E_o$ (FIG. 5D) is related to $E_e$ as the volt-time integral of $E_e$ divided by time because of the averaging characteristic of filter 21 (FIG. 2). Thus, if this volt-time interval is carefully controlled, the output voltage $E_o$ is also controlled.

Figure 6:
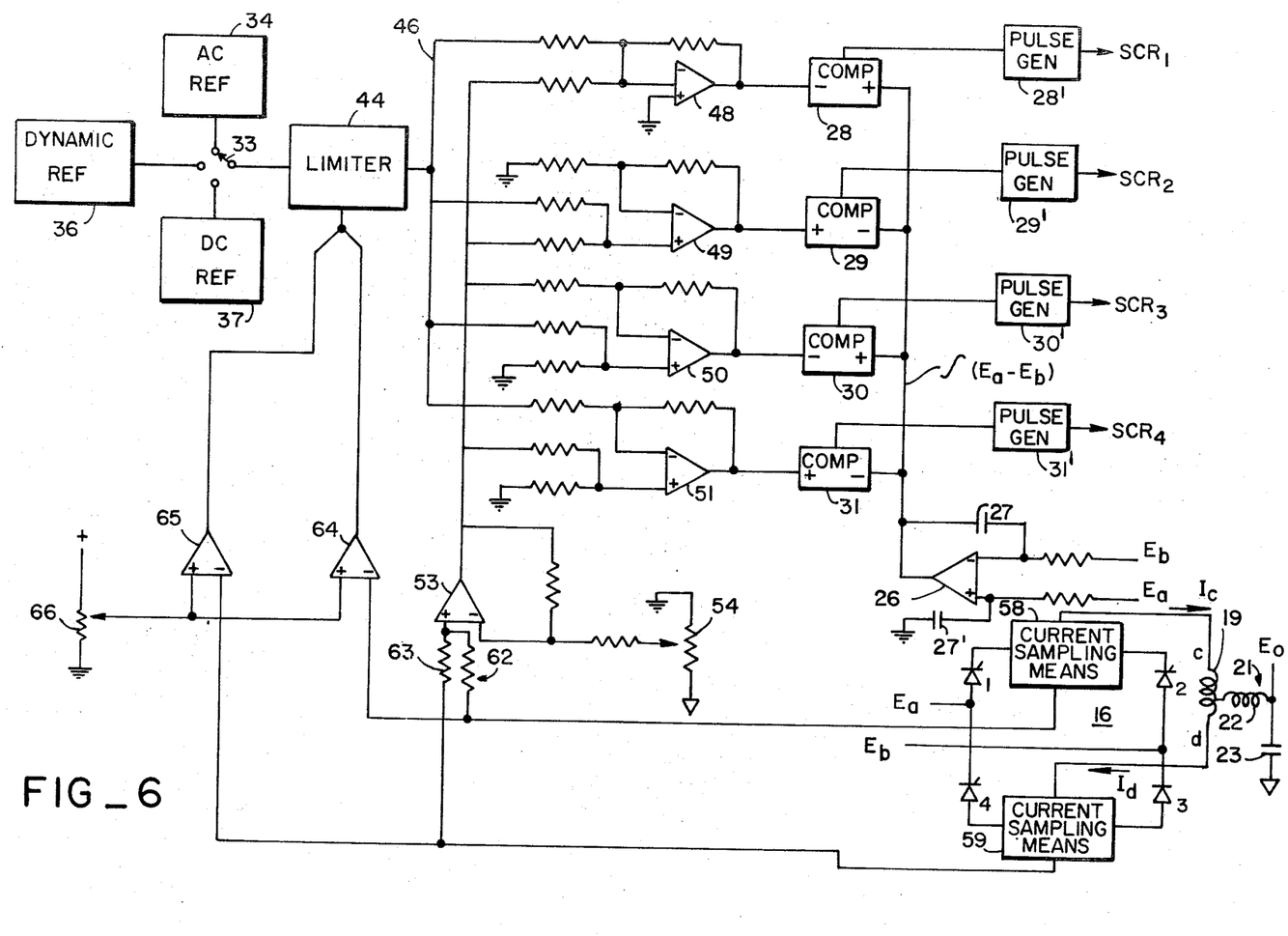
FIG. 6 is a detailed block diagram of the control means for the circuit of FIG. 2.

This is accomplished by the detailed control circuitry in combination with an SCR bridge rectifier as shown in FIG. 6 and as shown by the waveforms 7A through 7E. Since the voltage $E_e$ is necessarily related to the input voltages $E_a$ and $E_b$, the integral of their difference (FIG. 7B) when compared with equal magnitude ± references can be utilized to fire the SCRs 1 through 4 as shown in FIG. 7C.

By causing the SCR switching to occur in the proper order every time the integrated signal attains a value equal to one of the references, the darkened portions of the curve of FIG. 7B are an actual representation of each volt-time integral. The limits of integration are determined by the SCR switching and coincide with the intersection of the curve and the reference lines as shown. They accurately represent each volt-time integral contribution present in $E_e$. The positive or + reference is an accurate scale model of a fully filtered $E_o$ exclusive of any regulating characteristic of the circuit components themselves. FIGS. 7D and 7E illustrate how the $E_e$ waveforms are actual portions of $E_a$ and $E_b$.

Negative voltages of $E_o$ may be provided by reversing the sequence where, for example SCR3 precedes SCR1 and SCR4 precedes SCR2. This is done by causing the + reference to become less than zero and therefore, the − reference to become greater than zero.

Figure 7:
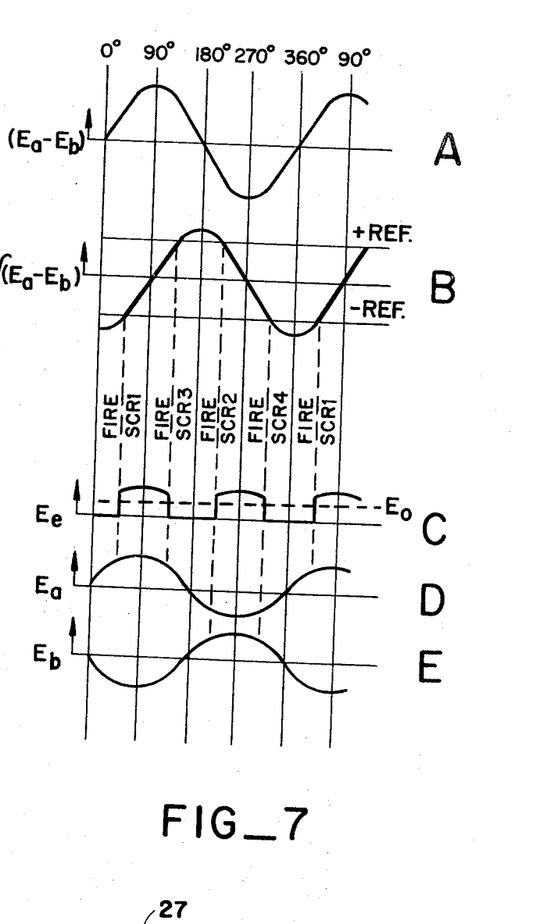

FIG. 7 C illustrates the production of a d.c. output voltage $E_o$. However, a variation of the reference voltage will cause the output signal to closely follow the programmed level of the reference changes.

Figure 8:
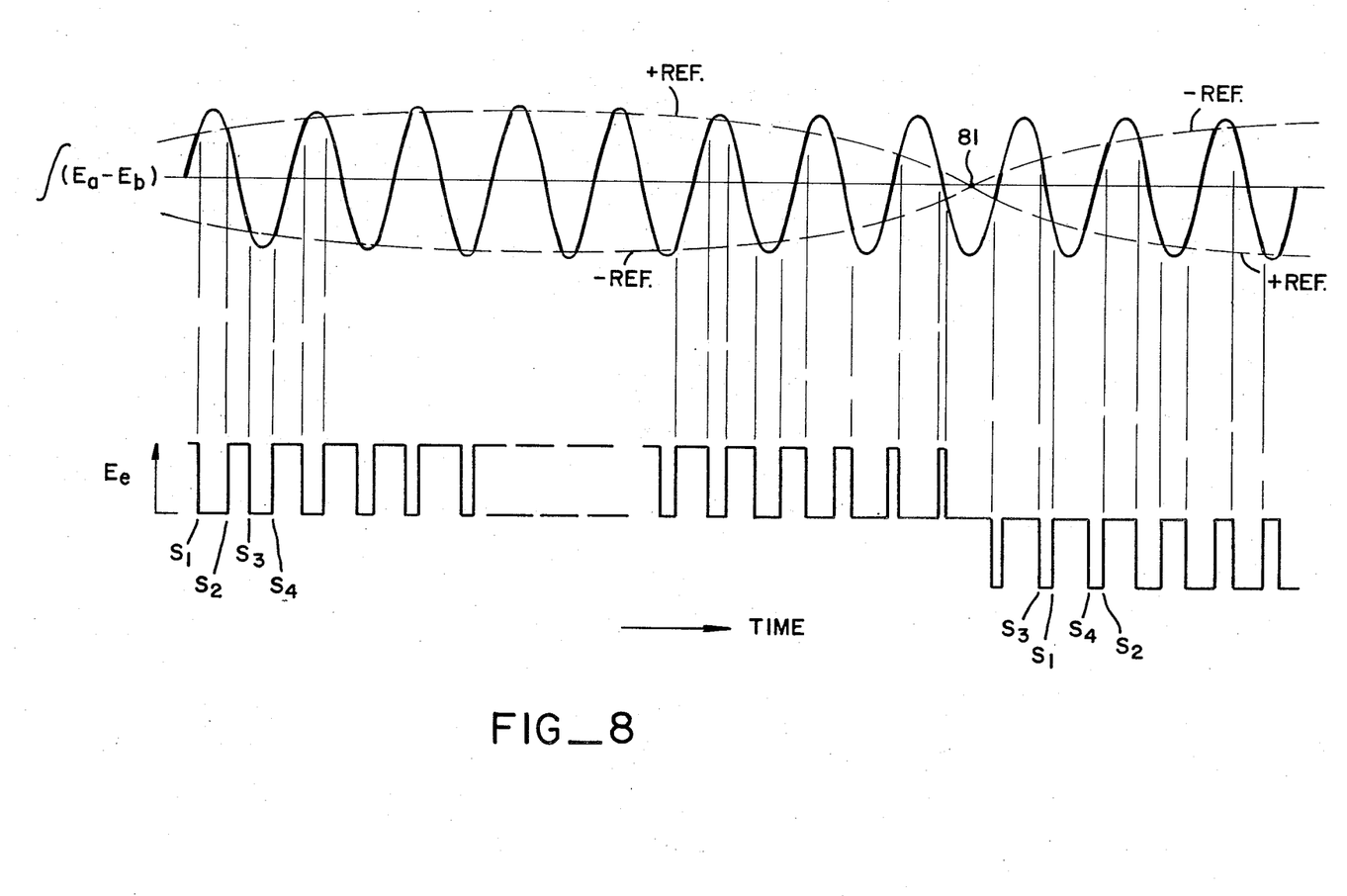
FIG. 8 is a waveform useful in understanding the operation of the invention.

A common program for the reference would be that of a 60 Hz sine wave which would be faithfully reproduced in greatly amplified magnitude by the regulator as an 120 volt a.c. 60 Hz output signal $E_o$. FIG. 8 illustrates such a reference in greatly compressed format. The magnitude of $E_o$ is determined by the variation of pulse width and a change in polarity takes place at the crossover point 81 of the + reference and − reference. The reversal of the SCR switching sequence is also shown.

If the Waveform-in, that is, the waveforms $E_a$ and $E_b$, should change because of some distortion in the input line the correction will be obtained at the next firing interval. Since the circuit operates at about 3,300 Hz and makes four decisions per cycle, the means time to correction is of the order of 80 microseconds. Moreover, these decisions are made in an instantaneous open loop fashion with respect to, as discussed above, only the instantaneous values of the integral of FIG. 7B and the reference voltages. The end result is that the output voltage waveform at $E_o$ is almost totally unperturbed by such waveform-in distortions.

The foregoing system is easily programmed for a 400 Hz output with little error. Given a suitable high frequency source and suitable reference-voltage control, it may be used as a precise output stage for d.c. 50, 60 or 400 Hz uninterruptible power sources as described in conjunction with FIG. 1. Alternatively, with proper reference voltage control, it may be used for d.c. or variable speed a.c. motor drives.

The control circuitry of the present invention is shown in FIG. 6 in conjunction with the bridge 16. The input waveforms $E_a$ and $E_b$ are integrated and subtracted by integrating operational amplifier 26. The $E_a$ voltage is coupled through the positive or noninverting input of amplifier 26 and $E_b$ to the inverting input. Capacitors 27 and 27' provide the integration effect. The output of amplifier 26 is coupled to voltage comparators 28 through 31. These comparators provide the decision making discussed in conjunction with FIG. 7. The outputs of the comparators are coupled to trigger circuits 28' through 31' which respectively fire or drive SCRs 1 through 4.

The reference voltages of FIG. 7B are derived through a switch 33 from several possible different sources. One of the sources is shown as d.c. reference 37 which corresponds to the illustration of FIG. 7B. Moreover as discussed above, an a.c. reference oscillator 35 or a dynamic control source 36 may be utilized.

Switch 33 is coupled through a limiter 44 to a buss line 46 coupled to four inverting amplifiers 48–51 which are respectively coupled to the voltage comparators 28 through 31. In the case of inverters 48 and 51 buss 46 is coupled to the inverting input designated (−) and in the case of inverters 49 and 50 to the noninverting input (+).

The outputs of inverters 48 and 50 are coupled to the negative voltage comparator input and the outputs of inverters 49 and 51 to the positive comparator inputs. The integrated signal from the output of integrator 26 is coupled to the opposite polarity terminal of the respective voltage comparators. The comparators produce an output when the positive input terminal is at a greater potential than the negative input terminal. The comparator outputs cause the pulse generators 28' through 31' to fire the SCRs when they change to a positive state.

By this method of connection, the proper sequence of firing is provided as illustrated in FIGS. 7B and 7C. Moreover, it can be seen that when it is desired to produce a negative output voltage, $E_o$, that a negative input at switch 33 will shift the sequence of operation on the voltage comparators.

In order to maintain the current $I_c + I_d$ circulating in the bridge rectifier circuit the remaining inputs of the inverters 48 and 51 are supplied a second reference signal from a differential amplifier 53.

The reference input to the differential amplifier 53 is provided by a variable potentiometer 54. Current sampling means 58 and 59 monitor the instantaneous value of $I_c$ and $I_d$ respectively. Their outputs are summed by resistors 62 and 63 and compared to the reference. By adjustment of potentiometer 54 the sum of $I_c + I_d$ may be set to a design value. In practice, the feedback loop circuit insures that this sum always equals the reference current provided by potentiometer 54. Moreover, as was discussed above, this sum is constant even with variations of load current.

In order to limit the load current to a value less than $I_c + I_d$, the reference input signal at switch 33 is clamped by limiter 44 under overload conditions. Clamp level inputs to limiter 44 are provided by differential amplifiers 64 and 65. The outputs of current sampling means 58 and 59 are compared to clamp reference level provided by potentiometer 66 by said amplifiers.

Thus, the control circuit of FIG. 6 performs the four basic tasks for the bridge regulator circuit. The first is firing the SCRs in the proper sequence. In other words, firing one pair of rectifiers with high frequency input waveform $E_a$ positive and then firing the remaining pair when it is negative so that full wave rectification takes place.

The second task accomplished by the control circuit is the advancing of the firing angle of each pair of SCRs with respect to the Waveform-in ($E_a$, $E_b$) so that a current is built up in the output autotransformer 19. This current is then maintained at a minimum level of one half the maximum desired output current. The upper limit of control is determined only by the capabilities of the Waveform-in, the circuit component current handling capability, and the tolerated losses.

The third control function or task is the individual alteration of firing angle of each SCR in response to the programmed or reference input through switch 33. The angles are altered in such a way as to insure that the output will be a faithful reproduction of the reference input signal and that the changes in the input waveform will not appear in the output.

The fourth control function is to clamp the first reference signal when the design output current level is exceeded. This action protects the bridge regulator and high frequency means from an overload condition.

Thus, the bridge regulator of the present invention is analogous to an amplifier. The Waveform-in supplies the raw power; the current circulating in the output autotransformer sets the operating point; and the input reference is faithfully amplified.

Figure 9:
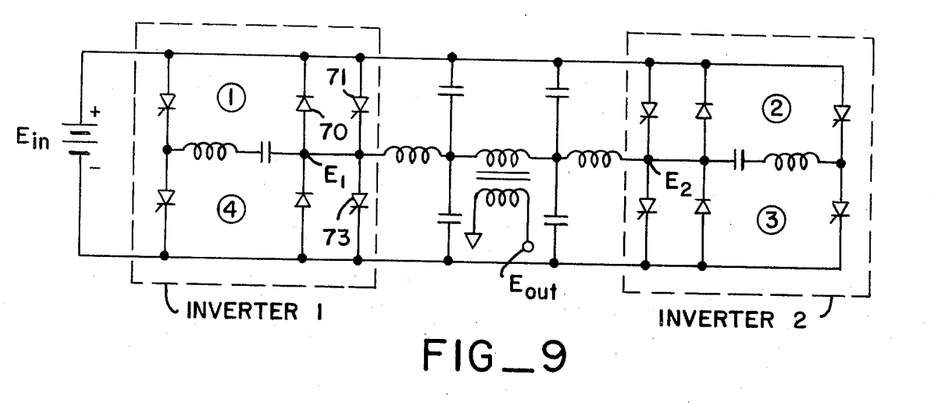
FIG. 9 is a circuit schematic of an inverter circuit of which the control system of the present invention is capable of driving.

Although the invention finds preferred usage in combination with the unique bridge rectifier circuit in FIG. 2, the control system of the present invention may also be used to provide a controllable output for inverter circuits such as that shown in FIG. 9. The inverter circuit shown is fully discussed in an article entitled "SCR Inverter Commutated by an Auxiliary Impulse," by W. McMurray in 1964 Proceedings of the Intermag Conference in Washington D.C. Reprints of the article are available from General Electric. By utilizing the control circuitry of the present invention, an accruate variable a.c. output is thereby provided. This is illustrated in FIG. 10C.

Referring specifically to the inverter circuit of FIG. 9, it is generally a full bridge orientation with two inverters (1 and 2) driving low pass filters and the primary winding of the output transformer. The four legs of the bridge have been designated with the circled numbers 1, 2, 3 and 4. When that specific leg is in conduction, that leg of the bridge is on and $E_1$ or $E_2$ is connected to either polarity of the battery designated $E_{in}$, as appropriate.

Figure 10A:
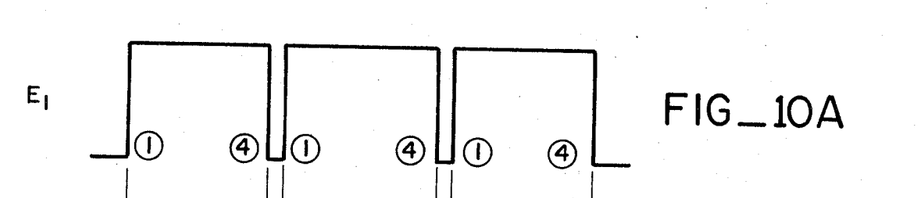
Figure 10B:
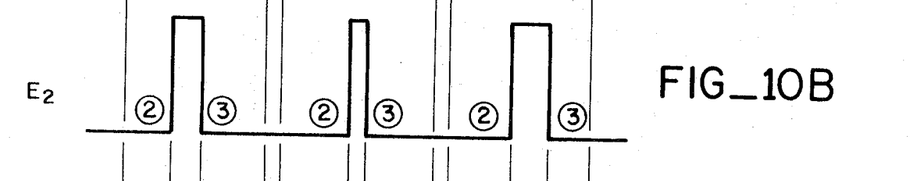

Each of the four bridge legs includes parallel diode SCRs, two of which, 70 and 71, are illustrated in the case of the Leg 1. The waveforms illustrated in FIGS. 10A–D are for a positive output voltage $E_{out}$. Specifically, FIG. 10A shows the polarity of the left inverter (1) where the circled 1 indicates the turn-on time of SCR 71 and the circled 4 the turn-on time of the SCR 73. This produces the voltage $E_1$ at the indicated junction. FIG. 10B shows the voltage $E_2$ of the right inverter.

Figure 10C:
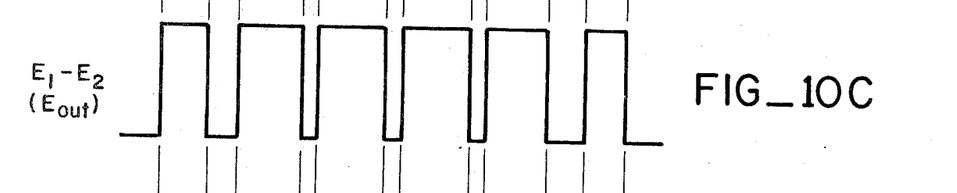
Figure 10D:
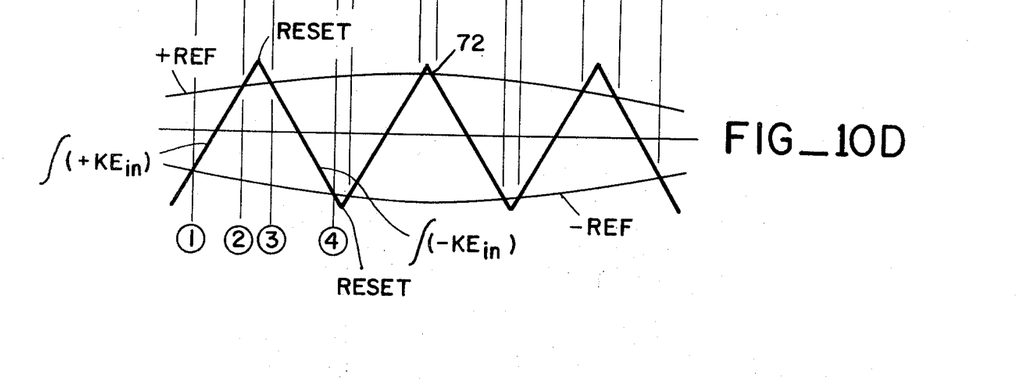
Figure 11:
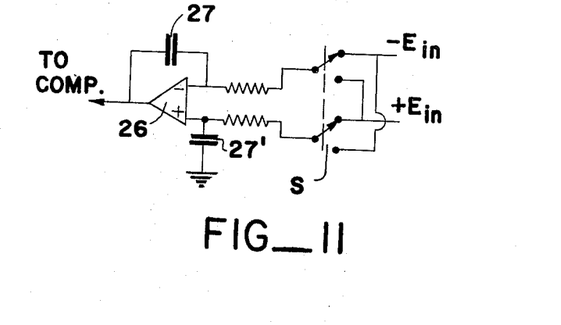
FIG. 11 shows means for operating on an input d.c. voltage to the control means of FIG. 6.

FIG. 10C illustrates the difference voltage between $E_1$ and $E_2$ which is applied to the low pass filters coupled to the primary winding of the output transformer. The magnitude of each half-cycle's contribution of $E_1 - E_2$ to the ouptut is seen to be the volt-time integral of the d.c. supply voltages switched on and off by Legs 1 vs 2, and 3 vs 4. How this is accomplished is illustrated in FIG. 10D by the triangular reference curve 80 which is derived from the battery voltage $E_{in}$ and more specifically is the integral of such battery voltage. Plus or minus references are provided as in FIG. 8 to determine the final output voltage. Because of the output transformer only a.c. outputs can, of course, be generated. The integral of the driving waveform $E_{in}$ provides the signal which drives one side of the comparators as illustrated in FIG. 6. Thus, the control system concept of the present invention is equally applicable to an inverter system where instead of integrating the a.c. input signal, the d.c. or battery voltage supplying the inverter is integrated. One minor modification which must be made is because of the constant d.c. supply voltage. It is necessary to invert the integral half the time and also to reset the integral periodically as indicated in the waveform of FIG. 10D. FIG. 11 shows a switch S for applying d.c. voltage to the inverter 26 to obtain the voltage waveform of FIG. 10D. The switch S is periodically operated to connect the upper and lower contacts alternately to the input terminals of the integrator 26.

Thus, the present invention has provided a new concept of open loop programmed SCRs in a bridge configuration coupled with an autotransformer to generate a wide range of desired outputs while exhibiting excellent regulation and high efficiency. The proper scaling of components permits the present invention to be utilized in a wide range of power applications where precision control over the input voltage and frequency is required.

We claim:

1. Power conversion apparatus for converting a high frequency signal to a relatively low frequency or controlled d.c. output signal comprising: an SCR bridge rectifier; means for applying two junctions of said bridge with a two phase high frequency signal; control means for controlling the firing of said SCR's to convert said high frequency signal to a low frequency signal, said control means including means for integrating said high frequency signal, means for providing a first reference signal, and comparator means responsive to said integrated signal and said first reference signal for firing said SCR's in predetermined order; and means coupled to the other two junctions of said bridge for coupling the low frequency signal to a load, said means including an autotransformer for immunizing the magnitude of the low frequency output signal against changes in load current.

2. Apparatus as in claim 1 wherein said autotransformer includes two ends and a center tap such ends being coupled to said other two junctions of said bridge and said center tap being adapted to couple to the load.

3. Apparatus as in claim 1 where said means for supplying said two junctions of said bridge with a two phase high frequency signal includes an autotransformer having a center tap referenced to a common with the load with two taps symmetrical with the center tap coupled to said high frequency signal and two taps symmetrical with the center tap coupled to such two junctions.

4. Apparatus as in claim 1 where said means for supplying said two junctions of said bridges with a two phase high frequency signal includes a transformer with its primary winding coupled to said high freuqency signal, its secondary winding coupled to such two junctions said secondary winding having a center tap referenced to a common with the load.

5. Power conversion apparatus for converting a high frequency signal to a relatively low frequency or controlled d.c. output signal comprising: an SCR bridge rectifier; means for supplying two junctions of said bridge with a two phase high frequency signal; control means for controlling the firing of said SCR's to convert said high frequency signal to a low frequency signal, said control means including means for integrating said high frequency signal, means for providing a first reference signal, and comparator means responsive to said integrated signal and said first reference signal for firing said SCR's in a predetermined order; means coupled to the other two junctions of said bridge for coupling the low frequency signal to a load, said means including an autotransformer for immunizing the magnitude of the low frequency output signal against changes in load current; and second reference signal means coupled to said comparator means for maintaining a predetermined current and flux level in said autotransformer.

6. Apparatus as in claim 5 where said autotransformer has first and second branch currents and where said second reference means includes means for sensing and summing said branch currents which sum is equal to said predetermined current and differential amplifier means responsive to any difference between said summed currents and a reference current of said reference means for causing a shift in the comparison level of said comparator means.

7. Apparatus as in claim 6 together with overload limit means coupled to said first reference signal means and responsive to said first and second branch currents for limiting said first reference signal.

8. Appparatus as in claim 5 wherein said means for providing said first reference signal includes means for providing both d.c. reference signals and a.c. reference signals of several different frequencies.

9. Apparatus as in claim 1 together with means for filtering said low frequency signal said filtering means including an inductor.

10. Apparatus as in claim 1 together with means for filtering said low frequency signal said filtering means including an inductor and a capacitor.

11. A control system for firing the control devices of a full wave rectifier circuit which converts a high frequency input signal to a relatively low frequency or controlled d.c. output signal comprising: means for integrating said high frequency signal; means for providing a first reference signal; comparator means responsive to said integrated signal and said reference signal for firing said control devices in a predetermined order; and means providing a second reference signal, said comparator means responsive to said second reference signal to maintain a predetermined circulating current in said rectifier circuit.

12. A control system for firing the control devices of an inverter circuit which produces a relatively low frequency or controlled d.c. output signal comprising: means for integrating the inverter's d.c. input signal to obtain an integrated signal; means for periodically inverting and resetting the integrated signal; means for providing a reference signal; and comparator means responsive to said reference signal and said integrated signal for activating said control devices in a predetermined order.

* * * * *

UNITED STATES PATENT OFFICE
CERTIFICATE OF CORRECTION

PO-1050
(5/69)

Patent No. 3,786,335   Dated Jan. 15, 1974

Inventor(s) Edward H. Phillips, Raymond D. Underwood

It is certified that error appears in the above-identified patent and that said Letters Patent are hereby corrected as shown below:

Column 4, line 27, "$\omega\delta t$", first occurrence, should read -- $\omega\Delta t$ --;

Column 4, line 35, "postiive" should be changed to --positive--.

Column 7, line 46, "accruate" should be changed to --accurate--.

Column 8, line 42, "applying" should be changed to --supplying--.

Column 9, line 2, "bridges" should be changed to --bridge--.

Signed and sealed this 5th day of November 1974.

(SEAL)
Attest:

McCOY M. GIBSON JR.
Attesting Officer

C. MARSHALL DANN
Commissioner of Patents